2,993,905
N-DIALKYLAMINOALKYL,N-PYRIDYLETHYL
ANILINES
Seymour L. Shapiro, Hastings on Hudson, Louis Freedman, Bronxville, and Harold Soloway, New Rochelle, N.Y., assignors to U.S. Vitamin & Pharmaceutical Corporation, a corporation of Delaware
No Drawing. Filed Apr. 24, 1959, Ser. No. 808,572
5 Claims. (Cl. 260—296)

This invention is concerned with a new group of anilines which have a variety of valuable pharmacological properties, and more particularly, properties as central nervous system depressants, anti-inflammatory agents, and analgesics.

More particularly, this invention is concerned with N-dialkylaminoalkyl,N-pyridylethyl anilines of the type I as shown:

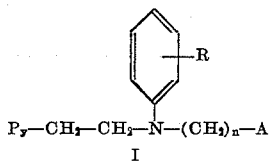

$P_y$—$CH_2$—$CH_2$—N—$(CH_2)_n$—A

I wherein $P_y$ is a 2 or 4 pyridyl group, or a lower alkyl substituted pyridyl group of this type, $n$ is an integer from two to four, R is a substituent in the benzene ring selected from the group consisting of hydrogen, halogen, lower alkyl and lower alkoxy, and A is a secondary alkylamino group having a carbon content $C_2$—$C_6$.

In contrast to typical antihistamine structures wherein the pyridine ring is attached to the central nitrogen, and the benzene group is attached through an alkylene unit, to give, for example, a benzyl group, the compounds of this invention have a pyridylethyl group attached to the central nitrogen, and the benzene group is attached directly to the central nitrogen to give an anilino structure.

The compounds of this invention are strong bases and can form stable acid addition salts with the non-toxic mineral acids and strong organic acids. More particularly, the mono-acid addition salts are preferred such as those derived from hydrochloric acid, hydrobromic acid, sulfuric acid and the like.

The reaction for formation of the compounds is in accordance with the following equation:

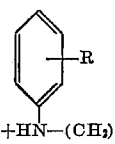

$P_y$—CH=$CH_2$+HN—$(CH_2)_n$—N—$(CH_3)_2$ ⟶   I

The N-dimethylaminoalkylaniline is treated with the vinyl pyridine in a lower alcohol containing an equivalent quantity of acetic acid. After heating under reflux for approximately 24 hours, the solvent is removed, the reaction mixture diluted with water, made alkaline with sodium hydroxide and extracted with ether, and the formed product is separated by fractional distillation.

The requisite N-dimethylaminoalkylanilines, in turn, are obtained by reaction of the dimethylaminoalkyl chloride with the appropriately substituted aniline using benzene as the solvent and sodium carbonate as the acid acceptor (Huttrer et al., J. Am. Chem. Soc. 68, 1999 (1946).

The following examples will illustrate the invention more fully, but are not to be construed as limiting.

EXAMPLE I

*N-dimethylaminoethyl,N-(2-[2-pyridyl]ethyl)-4-methoxyaniline*

A solution of 10.5 g. (0.1 mole) of 2-vinylpyridine, 19.4 g. (0.1 mole) of N-dimethylaminoethyl-4-methoxyaniline and 6.0 g. (0.1 mole) of acetic acid in 150 ml. of ethanol was heated under reflux for 24 hours. After removal of the solvent, the reaction mixture was diluted with 250 ml. of ice water, made alkaline with 40% sodium hydroxide and the separated oil extracted with three 100 ml. portions of ether. The ether extracts were combined, dried (magnesium sulfate), filtered, the ether removed, and the residue distilled. After a forerun of 8.6 g. (44%) of N-dimethylaminoethyl-4-methoxyaniline there was obtained 11.7 g. (40%) of product, boiling at 152–154° (0.07 mm.).

*Analysis.*—Calcd. for $C_{18}H_{25}N_3N_3O$: C, 72.2; H, 8.4; N, 14.0. Found: C, 72.1; H, 8.4; N, 14.3.

EXAMPLE II

In a similar manner, other compounds of this invention were prepared by variation of the vinyl pyridine, and the dimethylaminoalkyl aniline. The compounds prepared have been described in Table I, in some instances, the dipicrate was prepared to further characterize the product.

TABLE I $P_y$—$CH_2$—$CH_2$—N—$(CH_2)_n$—N—$(CH_3)_2$
$P_y$=[2-PYRIDYL]

| R | $n$ | Salt | B.P., °C. (mm. press) | M.P., °C. (recrystalliz. solvent) |
|---|---|---|---|---|
| 3-Cl | 2 | | 140–148 (0.03) | |
| 3-Cl | 3 | | 138 (0.02) | |
| 4-Cl | 2 | | 152–154 (0.09) | |
| 4-Cl | 2 | 2HPic | | 142–145° (acetone). |
| 4-Cl | 3 | | 166–170 (0.05) | |
| 4-Cl | 3 | 2HPic | | 160–163° (water). |
| 4-CH₃O | 2 | | 152–154 (0.07) | |
| 4-CH₃O | 2 | 2HPic | | 179–180 (methyl ethyl ketone). |

$P_y$=[5-ETHYL-2-PYRIDYL]

| H | 3 | | 170–174 (0.05) | |
|---|---|---|---|---|
| H | 3 | 2HPic | | 160–163 (methyl ethyl ketone). |
| 3-Cl | 2 | | 172–174 (0.02) | |
| 3-Cl | 3 | | 158–160 (0.03) | |
| 4-Cl | 3 | | 170–172 (0.02) | |

$P_y$=[4-PYRIDYL]

| H | 2 | | 154–156 (0.02) | |
|---|---|---|---|---|
| H | 2 | 2HPic | | 176–177 (acetonitrile). |
| 2-Cl | 2 | | | 99–100 (hexane). |
| 2-Cl | 2 | 2HPic | | 138–142 (ethanol). |
| 2-Cl | 3 | | 156 (0.09) | |
| 3-Cl | 2 | | 164–168 (0.02) | |
| 3-Cl | 3 | | 178–180 (0.02) | |
| 3-Cl | 3 | 2HPic | | 188–189 (acetonitrile). |
| 4-Cl | 2 | | 168–170 (0.07) | |
| 4-Cl | 2 | 2HPic | | 165–166 (acetonitrile). |
| 4-Cl | 3 | | 168–170 (0.05) | |
| 3-CH₃ | 2 | | 158–160 (0.05) | |
| 3-CH₃ | 2 | 2HPic | | 178–179 (acetonitrile). |

2HPic=2 moles of picric acid.

The novel compounds of this invention can be combined with solid or liquid pharmaceutical carriers and formulated into the form of tablets, powder packets or capsules or dissolved in suitable solvents for oral and parenteral administration for human and veterinary use.

It is to be understood that it is intended to cover all changes and modifications of the examples herein chosen for the purpose of illustration which do not constitute departures from the spirit and scope of the invention.
We claim:
1.
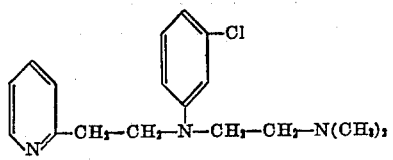
2.
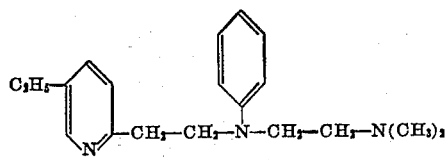
3.
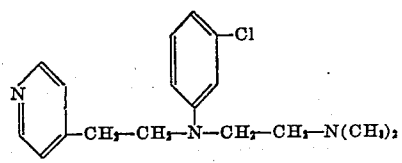
4.
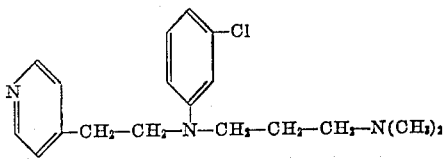
5.
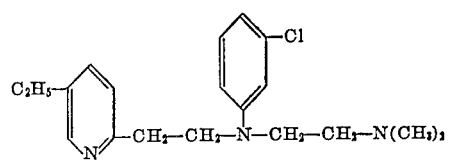
References Cited in the file of this patent
UNITED STATES PATENTS
| | | |
|---|---|---|
| 2,406,594 | Djerassi et al. | Aug. 27, 1946 |
| 2,615,892 | Clifford | Oct. 28, 1952 |
| 2,797,224 | Offe | June 25, 1957 |
FOREIGN PATENTS
| | | |
|---|---|---|
| 122,069 | Sweden | June 29, 1948 |